United States Patent [19]

Livermore et al.

[11] 4,134,392
[45] Jan. 16, 1979

[54] SOLAR ENERGY COLLECTION

[75] Inventors: Anthony W. Livermore, Chelmsford; Daniel W. Noren, Wakefield, both of Mass.

[73] Assignee: Spectrum Conversion, Inc., Wakefield, Mass.

[21] Appl. No.: 834,326

[22] Filed: Sep. 19, 1977

[51] Int. Cl.² .................................. F24J 3/02
[52] U.S. Cl. ..................................... 126/271
[58] Field of Search ..................... 350/293, 296; 136/89 PC; 126/270, 271; 237/1 A

[56] References Cited

U.S. PATENT DOCUMENTS

| | | | |
|---|---|---|---|
| 980,505 | 1/1911 | Emmet | 126/271 |
| 3,227,153 | 1/1966 | Godel et al. | 126/271 |
| 3,923,039 | 12/1975 | Falbel | 126/271 |
| 3,923,381 | 12/1975 | Winston | 126/271 |
| 3,939,819 | 2/1976 | Minardi | 126/271 |
| 3,952,724 | 4/1976 | Pei | 126/271 |
| 3,957,031 | 5/1976 | Winston | 126/270 |
| 3,958,554 | 5/1976 | Schmidt | 126/271 |
| 3,960,136 | 6/1976 | Moan et al. | 237/1 A |
| 3,991,742 | 11/1976 | Gerber | 126/271 |
| 4,002,499 | 1/1977 | Winston | 126/271 |
| 4,003,638 | 1/1977 | Winston | 126/271 |
| 4,016,860 | 4/1977 | Moan | 126/270 |
| 4,018,215 | 4/1977 | Pei | 126/271 |
| 4,038,967 | 8/1977 | Stout et al. | 126/271 |
| 4,063,545 | 12/1977 | Hapgood | 237/1 A |

OTHER PUBLICATIONS

"Solar Energy Research and Development", Chemical Engineering Division, Argonne National Laboratory.

Primary Examiner—Carroll B. Dority, Jr.
Attorney, Agent, or Firm—Kenneth D. Hudson

[57] ABSTRACT

A concentrating solar energy system is disclosed which permits efficient collection without tracking. The system comprises a collector having an elongate, trough-shaped body with an inner reflective surface having a cross-sectional curve of height H, throat opening T, and conforming substantially to the cartesian curve $Y = \pm AX^b$, the curve concentrating incident radiation into an included receiving area of maximum dimension R, wherein B is about 0.30 plus or minus 0.15, A is from about 0.5 to 2.5, H/T is between about 0.5 to 2.0 and preferably about 1, and the concentration ratio T/R is at least 3. For photothermal recovery, an absorptive liquid is used circulating in a transparent receiver tube, the liquid being automatically drained to avoid high temperatures when not circulating.

13 Claims, 10 Drawing Figures

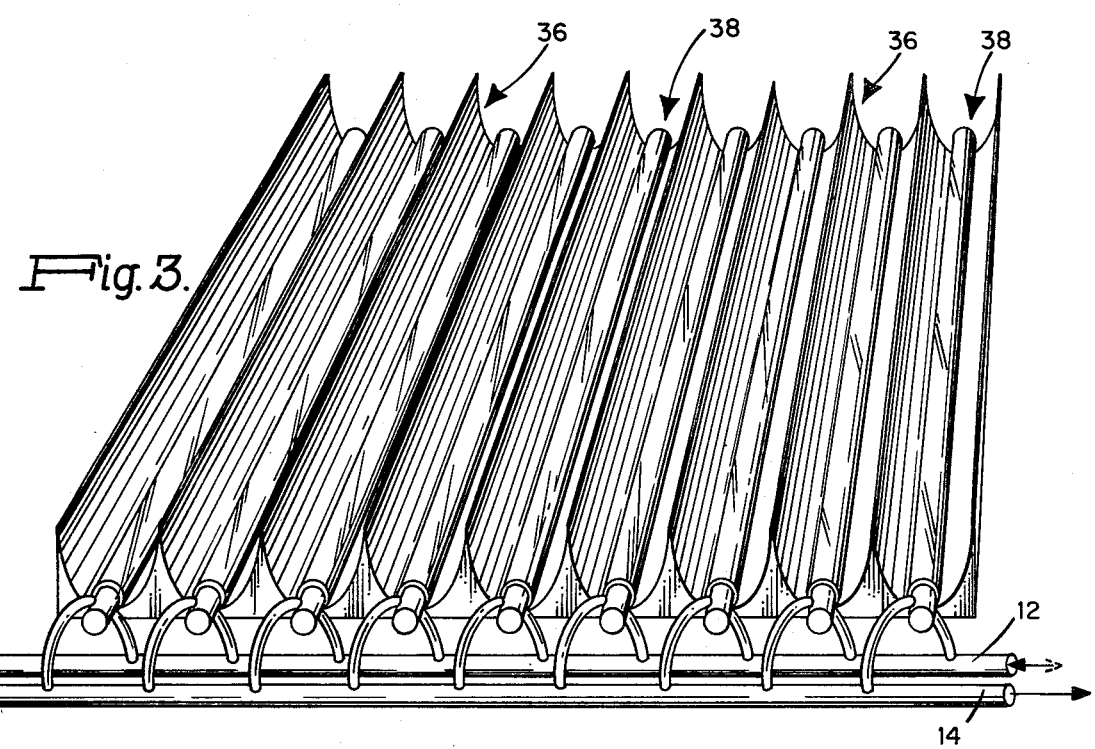
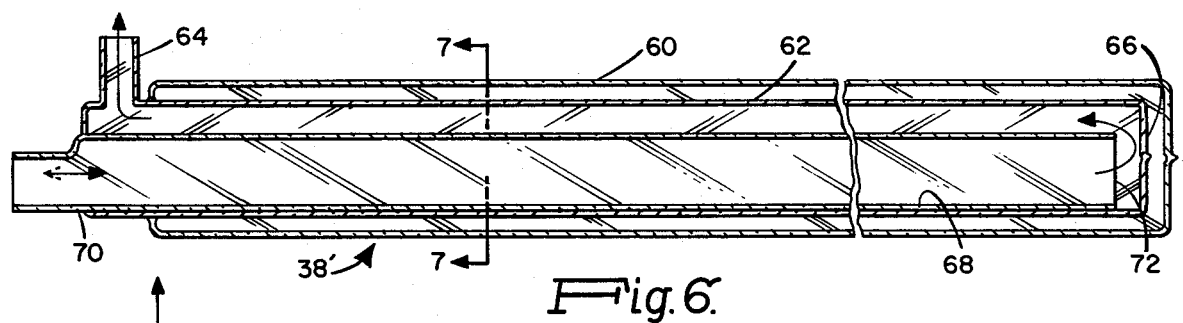
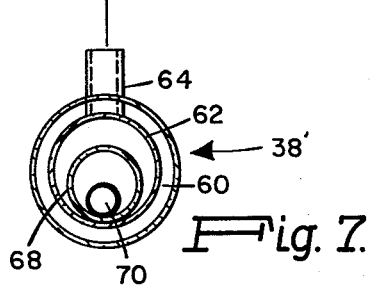
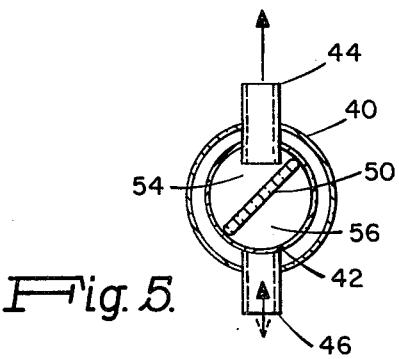
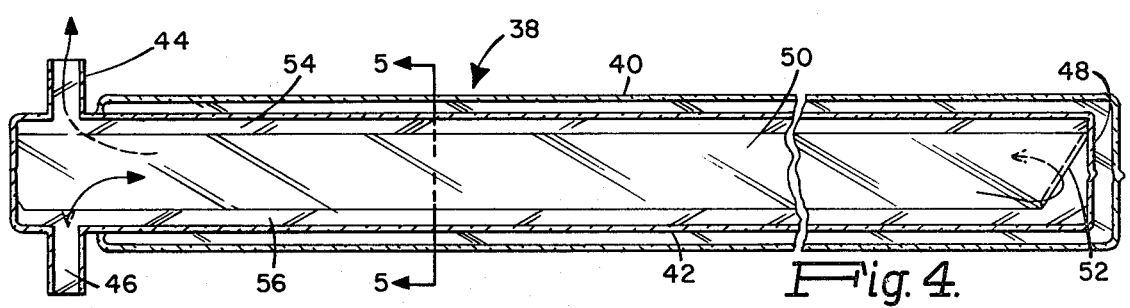

SOLAR ENERGY COLLECTION

BACKGROUND OF THE INVENTION

This invention relates to electromagnetic energy collection and more particularly to devices and systems for the collection and recovery of solar energy or the like. Solar energy is an increasingly important source of energy for space heating and cooling, process heat, electrical generation and the like. Relatively low temperatures are useful for space heating, but cooling and process applications generally require higher temperatures. Direct photovoltaic conversion to electricity is known but existing photovoltaic materials such as silicone wafer materials are currently expensive. Since solar insolation per unit of area is low, high efficiency and concentration are desirable.

Most of the solar energy collectors heretofore employed have been flat plate collectors without concentration. While simple, such systems are limited in efficiency and in the temperatures obtainable. Focusing collectors, that is those which concentrate solar energy by forming an image of the sun, are known and are capable of very high temperatures. However they can utilize only direct beam rays and require continuous tracking of the daily and seasonal solar movement. They cannot collect diffuse, scattered sunlight.

Improved nonfocusing concentrating collectors have been recently disclosed in U.S. Pat. No. 3,923,381 and further described in an article entitled: "Solar Energy Research and Development" published by the Argonne National Laboratory, dated June 19, 1976. Those references contain a good description of the different types of collectors and the advantages and applications for each. However, the nonfocusing collectors described have decreasing acceptance angles with increasing concentration and require means for repositioning monthly or seasonally for concentration ratios greater than about 2.

There is a continuing need in the solar energy field for a concentrating collector system which provides a concentration ratio of 3 to 6 or more and which is efficient at a sufficiently wide angle of incidence to permit use as a totally stationary collector. Moreover, with concentrating collectors capable of achieving substantially elevated temperatures, means are needed to prevent the buildup of dangerously elevated temperatures and pressures when the heat is not needed or the cooling system is inoperative.

Accordingly, principal objects of the present invention include provision of nonfocusing radiant energy collector systems and devices which are efficient at a sufficiently wide incident angle to be useful at concentration ratios of three or more as a stationary system, which minimize loss of absorbed energy, and which provide a simple and convenient means for controlling temperature.

SUMMARY OF THE INVENTION

According to one aspect of the present invention, an efficient nonfocusing collector is provided with a concentration ratio of 3 or more and with a high efficiency at a wide incidence angle of at least 40°, and typically about 60°, such that no solar tracking is required. The collector is an elongate trough-shaped member having an inner reflective surface with a substantially uniform cross-section, the cross-section substantially conforming to the curve $Y = \pm AX^b$, having a height H, a throat opening T, and concentrating incident radiant energy into an included receiver area of maximum dimension R, wherein X is positive, b is about 0.3 plus or minus 0.15, A is about 0.5 to 2.5, the ratio of H to T is between about 0.5 to 2.0 and preferably about 1, and the concentration ratio T/R is at least 3. Preferably the receiver area of energy concentration within the cross-section is a circle substantially in peripheral contact with the vertex of the curve and an elongate absorbing means for radiation is located in the collector at the receiver area.

The preferred collector according to the first aspect of the present invention concentrates about 99% of the rays incident within an acceptance angle of 60° where A in the above formula equals about 1.75, b equals about 0.3, each of H and T are about 6 inches and R is the diameter of a circle at about 1.5 inches, providing a concentration ratio of about 4.

According to a second aspect of the present invention, a radiation absorbing liquid is circulated through a transparent conduit located at a collector receiver area, the liquid being utilized both to photothermally absorb and transport the incident energy from the collector to a recovery system for storage or use. A pump or other suitable activatable means are provided to circulate the liquid through the conduit and means are provided for draining the liquid from the conduit when the pump is not operating. Preferably, the conduit is inclined to the horizontal with an outlet substantially at its lowest point, and the draining means comprises a reservoir below the conduit outlet. By thus employing an absorptive liquid both for energy absorption and transport, and providing for its automatic drainage from the collectors when the liquid is not circulating, energy absorption automatically terminates to avoid dangerous temperature buildup. Incident energy to the collector, in the absence of absorbing liquid, is re-radiated without substantial absorption or temperature increase.

In a third aspect, the present invention provides a novel receiver tube for circulation and automatic drainage of a radiation absorptive liquid within a concentrating collector, the tube being of material substantially transparent to and non-absorptive of said radiation and comprising an outer evacuated envelope and an inner elongate chamber which is sealed at one end and has inlet and outlet means at the other end, one being located at the lowermost position in said chamber, the inner chamber being divided into one portion for transporting said liquid from said inlet to said sealed end and a second portion for returning the liquid from the sealed end to said outlet. Preferably a longitudinal separator of transparent or reflecting material is positioned within the inner chamber to divide it into the said two portions.

DESCRIPTION OF THE PREFERRED EMBODIMENTS

In the accompanying drawings

FIG. 3 is a perspective view of one of the collector arrays illustrated in FIG. 2;

FIG. 4 is a longitudinal section through the preferred receiver tube within the collectors as shown in FIG. 3;

FIG. 5 is a section along the line 5—5 of FIG. 4;

FIG. 6 is a longitudinal section through an alternative receiver tube;

FIG. 7 is a section along the line 7—7 of FIG. 6; and,

Figure 10:
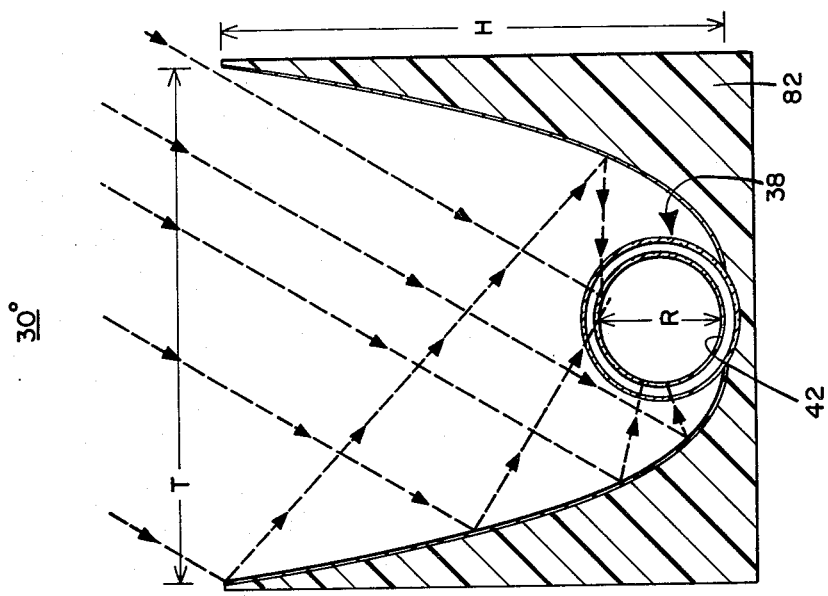
Figure 9:
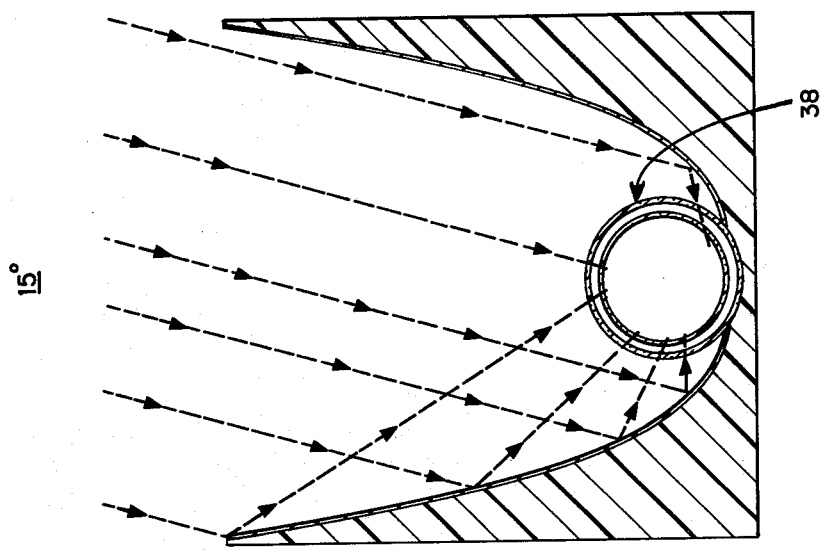
Figure 8:
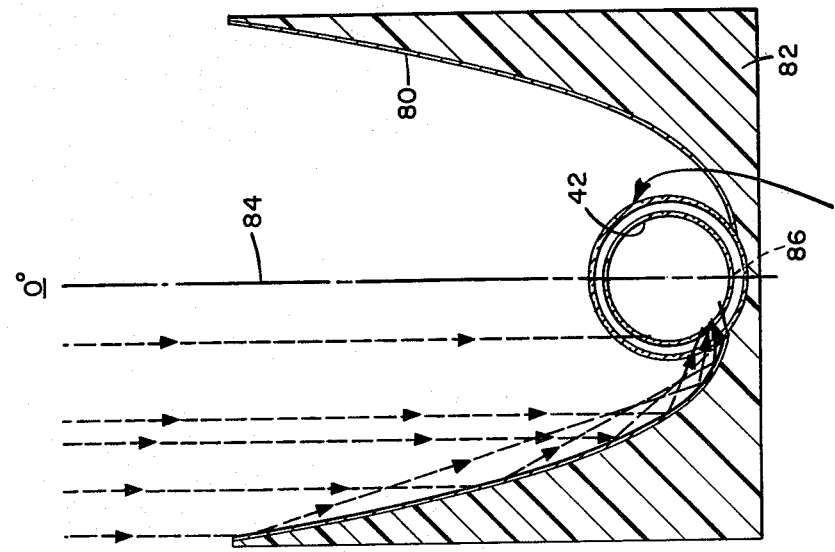

FIGS. 8—10 are transverse cross-sections through one of the identical collectors shown in FIG. 3 showing reflection of incident incoming rays at various incident angles.

Figure 1:
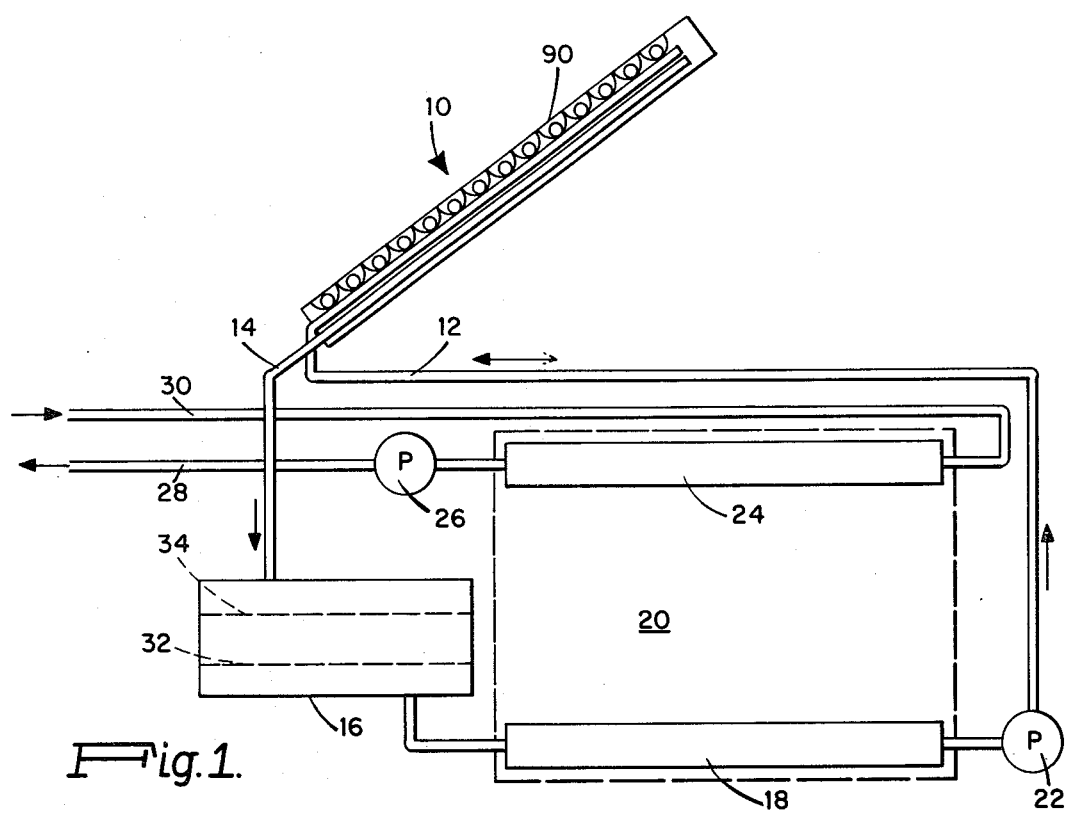
FIG. 1 is a schematic elevation of a solar heating system according to the present invention.

Referring to FIG. 1, a solar system according to the present invention is illustrated which comprises an array 10 of solar collectors exposed to sunlight, for example in fixed position on the roof of a building and tilted to the southern horizon, an inlet conduit 12 delivering liquid to the collectors, an outlet pipe 14 receiving photothermally heated liquid from the collectors, a reservoir 16, a heat exchange 18 in tank 20, and a pump 22 for circulating fluid through conduit 12 to collector array 10. Tank 20 is filled with water or the like for storing heat which is extracted by heat exchanger 24 and circulated by means of pump 26 to and from radiators or the like (not shown) for utilizing the heat via pipes 28 and 30 respectively. When the pump 22 is operating to fill conduit 12, collector array 10 and conduit 14 with liquid, the liquid level within reservoir 16 is illustrated at 32 and provides an air space thereover. When the pump 22 is not operating, the liquid drains from the collector array 10 into the reservoir 16, filling it to the level indicated at 34.

As illustrated in FIG. 3, the collector array 10 comprises a plurality of reflective collectors 36 which are trough-shaped as more fully hereinafter described and which have at their base receiver tubes 38. The preferred receiver tube is shown in FIGS. 4 and 5 and comprises an outer evacuated envelope 40 and an inner chamber 42 having inlet 46 communicating with inlet conduit 12 and outlet 44 communicating with outlet conduit 14. Chamber 42 is sealed at end 48 and both inlet 46 and outlet 44 are located at the opposite end thereof, inlet 46 being located at its lowermost position to drain liquid from the chamber. Extending longitudinally within the chamber 42 and across its diameter is a divider or separator 50 having a notched end 52 for passage of liquid and which divides chamber 42 into an inlet portion 56 through which liquid flows from inlet 46 to end 48 and an outlet portion 54 through which the liquid returns from the end 48 to outlet 44.

As shown, liquid circulated by pump 22 flows through inlet 46 to outlet 44. When pump 22 is turned off or fails, the liquid flow reverses, draining back through inlet 46, conduit 12 and pump 22 to reservoir 16. If desired, inlet 46 and outlet 44 may be reversed, with drainage directly through conduit 14 to reservoir 16. However reversing flow as shown is preferred to minimize cavitation during circulation. Divider 50 preferably fits loosely, or is notched, adjacent inlet 46 to allow complete drainage of liquid from chamber 42. As shown in FIG. 5, outlet tube 44, preferably extends into chamber 42 to prevent complete rotation of divider 50.

Figure 2:
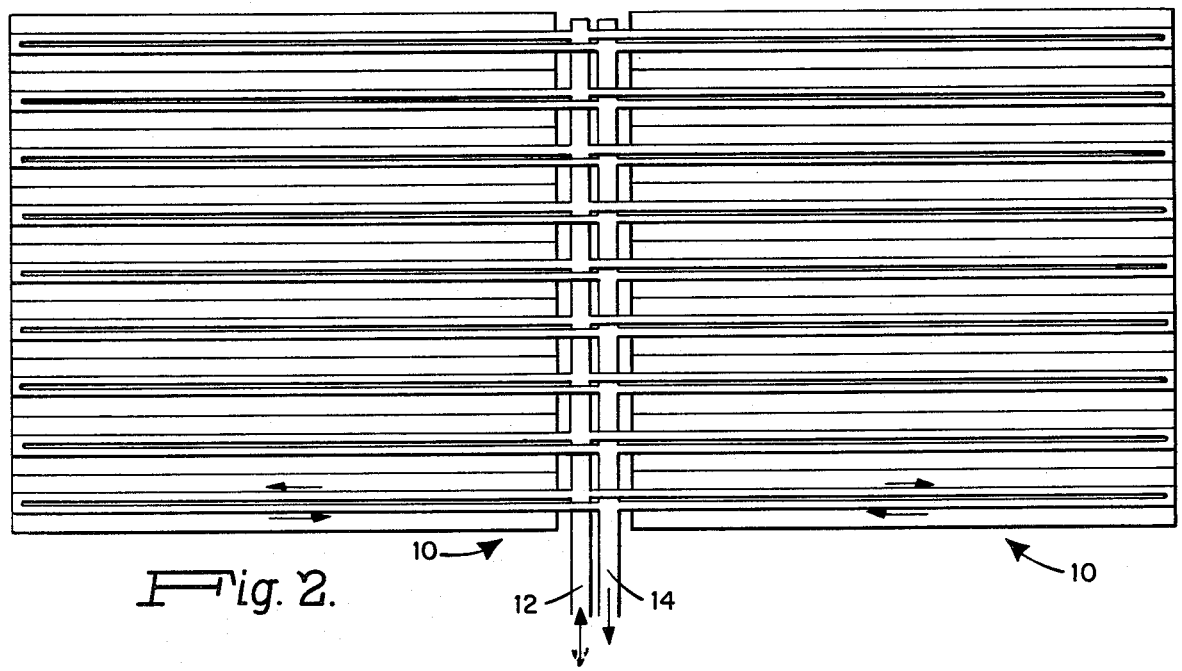
FIG. 2 is a plan view of an array of solar collectors as shown in FIG. 1.

Preferably, as schematically shown in FIG. 2, two arrays of collectors 36 are disposed around conduits 12 and 14 and the receiver tubes 38 are tilted to the horizontal such that the end having inlet 46 is below the sealed end 48 so that fluid flowing through chamber 42 will substantially drain by gravity to reservoir 16. Each array can be molded as a unit as more fully described hereinafter.

The envelope 40 and walls of chamber 42 of receiver tubes 38 comprise a material such as glass or plastic which is substantially transparent to sunlight and do not substantially absorb sunlight or become significantly heated thereby. The liquid circulating through the tubes comprises a liquid which is substantially absorptive of solar radiation and which serves both to absorb the incident sunlight, and to transport the resulting heat to reservoir 20. Divider 50 is likewise of material which is non-sorbent to sunlight and is preferably transparent but may be reflective rather than transparent since it is immersed in the liquid. By thus employing a single liquid as both the sorber and transporter of the radiant energy, in a transparent tube, the temperature can be controlled by flow rate when the pump 22 is operating and by automatic gravity drainage when the pump is not operating. With a concentrating collector as herein described, temperatures in excess of 500° F. are possible and such automatic control of the system is a desirable safety feature. Moreover, in a system sized to provide a substantial amount of the desired energy in winter, excess energy may be available in the summer and it may be necessary to operate the system intermittently under the control of a thermostat. The terms transparent, reflective, sorptive and nonsorptive are used herein in the conventional sense used in solar energy collection and refer to those portions of the solar spectrum useful for photothermal or photovoltaic conversion, principally visible wavelengths.

Any suitable liquid can be employed which is highly absorptive of sunlight. Water or water-antifreeze mixtures commonly employed are too transparent but can be made absorptive by addition of sorptive material therein, for example black soluble dyes. A 50-50% mixture by volume of water and ethylene glycol to which about three ounces per gallon of a black aniline dye has been added is suitable and preferred. It has a reflective densitometer reading of 378, compared to 170 for flat black paint and 200 for black velvet. Densitometer readings of at least 200, and as high as practical are preferred.

An alternative receiver tube is shown in FIGS. 6 and 7 which comprises an outer evacuated envelope 60, and an inner chamber comprising tube 62 communicating with outlet 64 and having a closed end 66, and an innermost tube 68 communicating with inlet 70 and having opposite end 72 terminating short of end 66 to allow liquid to flow from within the tube 68 outwardly through the tube 62. Tube 68 rests on the bottom interior wall of tube 62 and inlet 70 is at its lowermost point, again to provide substantially complete drainage of heat sorptive liquid by gravity when the circulating pump is not operating. Envelope 60 and tube 62 are of transparent material. Tube 68 is also preferably transparent but may be reflective and opaque if desired.

As shown in FIG. 3, the reflective trough-shaped collectors 36 are elongate and have a uniform transverse cross-section illustrated in FIGS. 8–10. The collectors have an inner reflective surface 80 which can comprise polished metal but which is preferably, as shown, a metallized layer on the inner surface of foam plastic 82. The transverse section of surface 80 substantially conforms to a curve of the equation $Y = \pm AX^b$, having two half curves symmetrical about an axis of symmetry 84 which is the positive X axis and which intersects the lower edge of surface 80 at the curve vertex 86. As shown in FIG. 10, the curve has a height "H", a throat opening "T", and concentrates incident radiation into a circular receiver area of diameter R, the diameter of inner chamber 42 of receiver tube 38.

FIGS. 8–10 illustrate ray traces for incident radiation parallel to the axis of symmetry 84 (FIG. 8), at an angle 15° thereto (FIG. 9), and at 30° thereto (FIG. 10). These figures illustrate that rays incident to the collector 36 at an angle from 0° to 30° in either direction from axis 84 either fall directly onto the receiver tube 38 or pass thereto with a minimum number of reflections, not more than five, and preferably not more than three. Thus the collectors illustrated concentrate most incident rays within an acceptance angle of at least 60°, an angle sufficiently large to permit them to be fixed in stationary position and absorb a high proportion of the incident radiation within that angle despite seasonal variation in solar elevation. Preferably, the longitudinal axis of the collectors extends east to west and the axis of symmetry 84 extends southward at an angle between the seasonal solstices. Collectors 36 are relatively long, for example eight feet, and have closed reflective ends (not shown) and receive and absorb energy from the daily solar movement without tracking. As indicated at 90 in FIG. 1, the upper surfaces of collectors 36 are preferably covered for protection with transparent material such as glass or plastic.

By testing and by computer and ray trace analysis, it has been determined that the equation for the cross-section of inner surface 80 of collector 36 should have an exponent b in the equation $Y = \pm AX^b$ which is less than a parabola and is preferably 0.3 ± about 0.15. In addition, the ratio of the throat opening T to the height H should be within the limits 0.5 to 2.0, and is preferably about unity. The constant A should be from about 0.5 to 2.5. Preferably, receiver tube chamber 42 is of circular cross-section with its lower edge substantially in contact with the curve vertex 86. The concentration ratio T/R is at least 4, and is preferably between 4 and 6. Wall 80 adjacent vertex 86 may be hollowed to accommodate evacuated envelope 40 as shown in FIGS. 8–10.

A collector 36 was constructed as above described conforming to the equation $Y = \pm AX^b$ where X and Y are cartesian coordinate points on the curves, the 0,0 point being the curve vertex 86. In the model constructed, A was about 1.5, b about 0.39, H and T about 6 inches, and R about 1 inch. The model was found to have, for an outside ambient temperature of 41° F. in March at Boston, Massachusetts, a peak instantaneous energy output of 240 BTU/square foot per hour, an output temperature of 175° F., and an average heat recovery of 160 BTU/square foot per hour for a six hour day. These values are substantially higher than available flat plate collectors. The model had a concentration ratio of 6, and did not require seasonal or daily position change. The half-curve efficiency was determined to be 78%, i.e., 78% of all rays incident on each one-half of the curve at angles from 0° to plus 30° from the axis of symmetry shown in FIGS. 8–10 fell within the receiver area with not more than five reflections. Half-curve efficiencies were determined by choosing ten equally spaced points along the Y axis from 0 to 1/2T, and determining if incident rays from 0° to 30° in 5° increments to each of those points were reflected to the receiver area in five or less reflections. The percent efficiency was the percentage of the 70 rays, seven for each of the ten points, which reach the receiver area, each ray being discounted by one-twentieth for each reflection. Further study has indicated that the optimum and preferred configuration for the reflectors has approximately the following parameters: A = 1.75, b = 0.30, T and H = 6 inches, R = 1.5 inches. With this configuration, the collector has a surprising full curve efficiency of 99%; 99% of all incident rays within a 60° acceptance angle (± 30° from the axis of symmetry) being collected within the receiver area with no more than three reflections. The peak instantaneous heat output is estimated to be 305 BTU/square foot per hour, with an average output per 6 hour day in March at 40° north latitude of about 200 BTU/square foot/hour, the collector concentrating both direct beam and scattered radiation. All rays falling onto either side of the reflector surface 80 from within the 60° angle pass to the receiver chamber 42.

The preferred collectors described above can produce temperatures in excess of 500° F., the output temperature being controlled by the circulating flow rate of absorbing liquid therethrough. They can be mounted in fixed position on any desired surface and suitably oriented to collect energy throughout the year. For mounting to a supporting surface which is not inclined at a desirable angle, the collectors 82 may be molded with a base which compensates therefore, i.e., the base may be parallel to the proposed surface and the axis of symmetry 84 angled thereto to dispose it at the desired angle to the horizon.

While the preferred example given above is believed to be the most practical and efficient, other curves within the previously stated limits can provide good efficiency and angular acceptance and may prove cheaper or of more suitable dimensions for a particular application. The height H of the two half curves of surface 80 are preferably equal but one may be somewhat higher if desired. The throat opening T, in such case, is taken at a line perpendicular to the axis of symmetry 84 which intersects the outer edge of the shorter side.

The equation $Y = \pm AX^b$ defines half curves on either side of the positive X axis, respectively $Y = AX^b$ for positive values of Y and $Y = - AX^b$ for negative values of Y. Preferably A and b have the same values in both half curves and the cross-section is symmetrical about the positive X axis, the axis of symmetry 84. However, if desired, A and b may have different values within the above stated limits and the full curve will be asymmetric, one half curve being more efficient than the other. Also, the two half curves may be tilted slightly, or moved together or apart somewhat, from the axis 84, but again with reduced efficiency.

While the embodiments described above employ liquids to capture heat by photothermal conversion for heating, cooling or the like, a photovoltaic material may be disposed at the area of concentration for the direct generation of electricity. Concentration in a stationary collector is advantageous since it reduces substantially the amount of photovoltaic material required and increases its efficiency. A strip of photovoltaic material may be disposed within the chamber 42, for example as illustrated for the divider plate 50, or it may be separately supported without enclosure in a similar position within collector 36. Its orientation is preferably along the axis 84.

It has also been found that the present invention can be employed to heat and cook food. For example, a hollow metal tube having an absorptive outer surface of diameter R may be substituted for receiver tube 38 in collector 36 and food placed within the metal tube, for example, frankfurters. The collectors thus provide a simple and readily portable cooking apparatus for use where more conventional cooking facilities are not available, allowed or desired. A hollow absorptive tube for the food is preferred since it assures good absorption of radiation, provides an enclosure readily removed and cleaned, and protects the reflecting surface 80. If desired, however, a fine support of wire or the like may be provided to support the food.

While the present invention is described and primarily useful for collecting solar energy, it is also useful for collecting and concentrating other sources of electromagnetic radiation, especially radiation from position-variable or diffuse sources. Inversely, the collectors may be used as diffusers of radiant energy emminating from a source within the collector receiver area.

It should be understood that the foregoing descriptions are for the purpose of illustration and that the invention includes all equivalents and modifications within the scope of the appended claims.

What is claimed is:

1. A non-focusing collector for concentrating electromagnetic radiation into a receiver zone comprising an elongate trough-shaped body having an inner reflective surface of substantially uniform transverse cross-section, said cross-section concentrating incident radiant energy into an included receiving area with a maximum dimension R, having a height H and a throat opening T, and being defined by half curves on either side of the positive X axis substantially conforming, respectively, to the cartesian equations $Y = AX^b$ and $Y = -AX^b$, said half curves when extended substantially meeting in a common vertex at the intersection of the X and Y axes, and wherein for each equation X is positive, b is about 0.30 plus or minus 0.15, A is about 0.5 to 2.5; the ratio of H to T being between about 0.5 to 2.0, and the concentration ratio T to R being at least about 3.0, said receiver zone being a volume of uniform cross-section which coincides with said receiving area.

2. A collector according to claim 1 having elongate absorbing means for said radiation located substantially within said receiver zone.

3. A collector according to claim 2 wherein said half curves are substantially symmetric about the X axis and wherein said receiving area of energy concentration is substantially a circle of diameter R having its lower edge substantially at the common vertex of said half curves.

4. A collector according to claim 3 wherein A equals about 1.75, b equals about 0.3, and R is about 1.5 inches.

5. A collector according to claim 4 wherein each of H and T are about six inches.

6. A collector according to claim 5 having elongate absorbing means for said radiation located substantially within said receiver zone.

7. A solar energy collecting system comprising an array of collectors according to claim 3 exposed to sunlight, and means for transferring absorbed energy from the collectors.

8. A solar energy collecting system comprising an array of collectors according to claim 1 exposed to sunlight, each of said collectors having a conduit which is substantially transparent to sunlight located at said receiver zone, means activatable for circulating through said conduit a liquid which is highly sorptive of sunlight, said liquid both absorbing and transporting said energy, and means for draining and storing said liquid from said transparent conduits when said circulating means is deactivated.

9. A solar energy collecting system according to claim 8 wherein said means for draining and storing said liquid comprises a reservoir below said conduits, and wherein said conduits are inclined to the horizontal with liquid outlets at their lower ends whereby said liquid flows therefrom to said reservoir by gravity when said circulating means is deactivated.

10. A stationary solar energy collector system comprising a plurality of collectors according to claim 5 arrayed for exposure to sunlight, each of said collectors having disposed at said receiver zone an elongate receiver tube of material substantially transparent to sunlight, said receiver tube comprising an outer evacuated envelope and an inner chamber having inlet and outlet means for passage of a sunlight sorptive liquid therethrough, one of said means being located at substantially the lowest point in said chamber, activatable means for circulating said liquid through said chamber, and means for draining said liquid from said chamber when said circulating means is deactivated.

11. A solar energy system according to claim 10 wherein said draining means comprises a reservoir below said chamber for receiving the liquid from the tubes by gravity when the pump is deactivated.

12. A solar energy collecting system according to claim 8 wherein said conduit comprises a self-draining tube having an evacuated outer envelope and at least one elongate inner chamber for circulating a solar sorptive liquid, said inner chamber being sealed at one end and having inlet and outlet means at the other end, one of said means being at the lowest point of the chamber to permit drainage by gravity, said inner chamber being divided into one portion for transporting said liquid from said inlet means to said sealed end, and a second portion for returning said liquid from said sealed end to said outlet means.

13. A self-draining tube according to claim 12 wherein said outer envelope and inner chamber are of transparent material, said inner chamber being divided into two portions by means of a non-sorptive separator.

* * * * *